United States Patent [19]
Shimizu

[11] Patent Number: 6,000,187
[45] Date of Patent: Dec. 14, 1999

[54] CONNECTION STRUCTURE AND CONNECTOR MEANS FOR A CABLE/PIPE BED

[75] Inventor: Shohachi Shimizu, Gifu-Ken, Japan

[73] Assignee: Mirai Industries Co., Ltd., Japan

[21] Appl. No.: 09/065,260

[22] Filed: Apr. 23, 1998

[51] Int. Cl.$^6$ .................................................. F04B 1/342
[52] U.S. Cl. ........................ 52/573.1; 403/292; 403/293; 403/362; 248/49
[58] Field of Search .................................... 403/292, 293, 403/362; 248/49; 52/573.1

[56] References Cited

U.S. PATENT DOCUMENTS

| | | | |
|---|---|---|---|
| Re. 35,479 | 3/1997 | Witherbee et al. | 248/49 |
| 2,117,798 | 5/1938 | Gascoigne et al. | 52/573.1 |
| 2,905,416 | 9/1959 | Wiegand . | |
| 3,042,351 | 7/1962 | Dubois . | |
| 3,246,433 | 4/1966 | Eriksson . | |
| 3,282,011 | 11/1966 | Meserole et al. | 52/573.1 |
| 3,448,955 | 6/1969 | Fussell . | |
| 3,521,843 | 7/1970 | Ogle . | |
| 3,593,974 | 7/1971 | Reid | 52/573.1 X |
| 3,598,349 | 8/1971 | Drake . | |
| 3,915,420 | 10/1975 | Norris . | |
| 4,229,362 | 10/1980 | Buluschek et al. | 248/49 |
| 4,314,771 | 2/1982 | Lambert . | |
| 4,367,979 | 1/1983 | Milligan . | |
| 4,932,183 | 6/1990 | Coulston | 52/573 X |
| 5,106,050 | 4/1992 | Vaccaro et al. . | |
| 5,242,137 | 9/1993 | Yang | 248/49 |
| 5,256,002 | 10/1993 | Shimizu . | |

FOREIGN PATENT DOCUMENTS

| | | |
|---|---|---|
| 7193938 | 7/1995 | Japan . |
| 1492415 | 11/1977 | United Kingdom . |

*Primary Examiner*—Carl D. Friedman
*Assistant Examiner*—Phi Dieu Tran A
*Attorney, Agent, or Firm*—Baker & Maxham

[57] ABSTRACT

A connection structure capable of coping with thermal expansion and shrinkage of a cable/pipe bed is disclosed. There are also disclosed a connector panel (30) and a connector belt or wire (40) to be utilized in the connection structure. A cable/pipe bed which utilizes the present invention comprises a plurality of cable/pipe bed sections (10a, 10b) each comprising two side rails (20a, 20b) and a floor (51, 52). Each side rail comprises an outer engagement protrusion or protrusions (21) to engage an inner engagement protrusion or protrusions (31) of the connector panel (30). The connector panel (30) holds two such side rails (20a, 20b) in longitudinal alignment, one (20a) securely and the other (20b) slidably to cope with thermal expansion and shrinkage of the side rails. Accidental separation of the side rails (20a, 20b) is adequately prevented by use of the connector belt or wire (40).

9 Claims, 7 Drawing Sheets

CONNECTION STRUCTURE AND CONNECTOR MEANS FOR A CABLE/PIPE BED

BACKGROUND OF THE INVENTION

1. Field of the Invention

This invention generally relates to a connection structure for a cable/pipe bed for laying flexible linear bodies such as communication cables, electric power cables, water or gas pipes, and cable protection pipes, and connector means to be utilized in the connection structure. More particularly, this invention relates to a connection structure and connector means to be utilized in the connection structure, which can adequately cope with longitudinal thermal expansion and shrinkage of a cable/pipe bed.

2. Background Art

Cables and/or flexible pipes are conventionally installed in a factory or power station often on an elongated metal or aluminum cable/pipe bed which comprises a plurality of cable bed sections connected together in longitudinal alignment by means of connectors, which is usually suspended from ceilings or attached to walls.

Japanese Patent Laid-Open Publication No. 7-193938 (application filed by the present applicant) discloses a cable/pipe bed as shown in FIG. 10 (prior art), comprising a plurality of cable bed sections 120 each of which comprises a pair of side rails 120a each having a plurality of engagement protrusions 121, and rungs 120b mounted in parallel between the side rails 120a. The side rails 120a of two adjacent bed sections 120 are correspondingly connected in longitudinal alignment with two connector panels 200 respectively mounted over the adjoining ends of the side rails 120a.

Each connector panel 200 comprises a panel body 201 having a plurality of engagement protrusions 111 which firmly engage the corresponding engagement protrusions 121 of the side rails 120a by means of aslant fastening between the corresponding engagement protrusions 111 and 121 by means of a plurality of threaded bolts 130 securely screwed into corresponding threaded bolt holes 112 formed aslant in the panel body 201 onto longitudinal aslant surfaces 120c formed on the side rails 120a.

The engagement between the corresponding engagement protrusions 121 and 111 of the side rails 120a and the connector panels 200 is provided very securely since the bolts 130 are screwed aslant through the aslant threadedbolt holes 112 against the aslant surfaces 120c, as taught in said Japanese patent application, which will be readily appreciated by a person skilled in the art.

Each two longitudinally adjoining side rails 120a (usually made of aluminum, cast aluminum or aluminum alloy) are firmly connected in contact with each other, end to end, hardly providing leeway to accommodate to longitudinal thermal expansion in summer or shrinkage in winter of the side rails 20, which tends to awkwardly wind the cable/pipe bed or forcibly break the alignment and connection of the longitudinally aligned side rails 120a, possibly causing accidents.

Accordingly, it is an object of the present invention to provide a connection structure for such a cable/pipe bed to adequately cope with longitudinal thermal expansion and shrinkage of the cable/pipe bed.

It is another object of the present invention to provide connector means to be utilized in the connection structure of the present invention.

Other objects of the present invention will be readily appreciated from the following descriptions.

SUMMARY OF THE INVENTION

The present invention provides a connection structure for a cable/pipe bed, which can adequately cope with the problem of thermal expansion and shrinkage of the cable/pipe bed to eliminate possibility of accidents as well as awkward winding of the cable/pipe bed. The present invention also provides connector means to be utilized in that connection structure, comprising connector panels and connector belts or wires.

A cable/pipe bed, where the connection structure of the present invention is utilized, comprises a plurality of cable/pipe bed sections each comprising a plurality of parallel side rails and cable floor means such as rungs mounted in parallel between the side rails. Such side rails and floor means may be provided in a unit. Each side rail is provided on its outer surface with a plurality of outer engagement protrusions or projections. Each two longitudinally adjoining side rails are held in alignment by a connector panel having a plurality of inner engagement protrusions or projections on its inner surface, which can correspondingly and partially engage the outer engagement protrusions of the two longitudinally aligned side rails.

Those longitudinally aligned two side rails are held together having an appropriate gap therebetween with the connector panel by the corresponding engagement between the outer protrusions of the side rails and the inner protrusions of the connector panel, in which one side rail is securely held and the other "loosely" or slidably held to allow slippage of the loosely held side rail. The firm holding of one side rail is provided by threaded bolts firmly screwed into bolt holes formed in the connector panel onto bolt receiver surface formed on the side panel, while the "loose" holding of the other side rail is provided by not using any such bolts, or by "loosely" fastening such bolts such that the bolts may substantially contact the bolt receiver surface to prevent rattling between the side rails and the connector panel.

The connection structure of the present invention also utilizes connector belts or wires to prevent accidental dismantling or excessive separation or slippage of cable bed sections. The ends of the connector belt or wire are respectively attached to the longitudinally aligned cable bed sections, generally having a degree of flection when installed in the summer time or a warm season to accommodate to shrinkage in the winter time or a cold season. When installed in the winter time or a cold season, the connector belt or wire may be mounted substantially without any such flection, in which case the gap between two cable bed sections should be largest to accommodate to thermal expansion in summer.

BRIEF DESCRIPTION OF THE DRAWINGS

The present invention is described in further detail hereinafter utilizing a few embodiments of the present invention and the accompanying drawings, in which.

DETAILED DESCRIPTION OF PREFERRED EMBODIMENT

Figure 1:
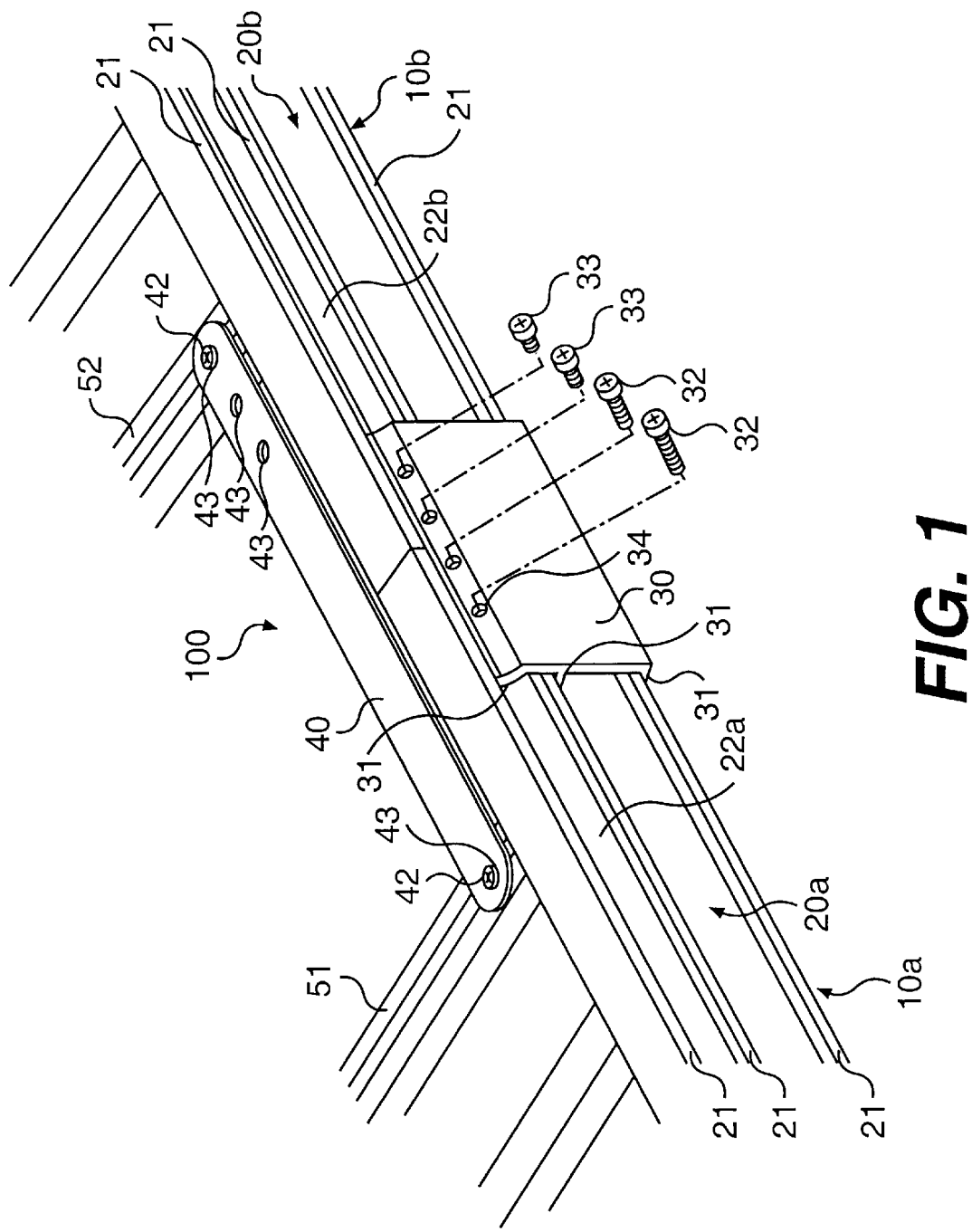
FIG. 1 is a perspective view of a connection structure according to an embodiment of the present invention.

In FIG. 1 there is shown a connection structure 100 according to an embodiment of the present invention, which can adequately cope with thermal expansion and shrinkage of a cable/pipe bed which is partially shown. The connection structure is utilized to connect two longitudinally aligned cable/pipe bed sections 10a and 10b generally having a gap therebetween, each cable/pipe bed section 10a or 10b including two parallel side rails 20a or 20b each having a plurality of outer engagement protrusions 21 on its outer surface, by means of two connector panels 30 each having inner engagement protrusion 31 on its inner surface.

Figure 2:
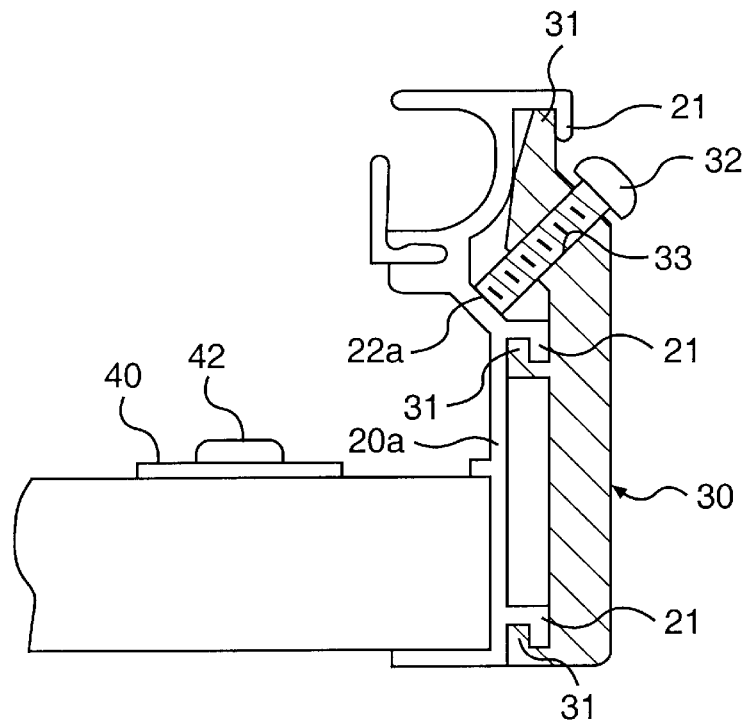
FIG. 2 is a partially sectioned front view of the embodiment of FIG. 1, showing in detail the connection between a connector panel and a side wall of a cable bed section.

The outer engagement protrusions 21 of the side rails 20a and 20b correspondingly and partially engage the inner engagement protrusions 31 of the connector panel 30 as shown in FIG. 1 and FIG. 2 for detail. The connector panel 30 has a plurality of bolt holes 34 (four in this embodiment), the direction of which is substantially different from the direction of the engagement between the engagement protrusions 21 and 31 as shown in FIG. 2 in detail.

In this embodiment, the side rail 20a of the cable/pipe bed section 10a is firmly held by the connector panel 30 by means of two threaded bolts 32 securely screwed through the left two bolt holes 34 onto the aslant surface 22a. As shown clearly in FIG. 2, the aslant screwing of these two bolts 32 will securely tighten the corresponding engagement between the engagement protrusions 21 and 31, which will be readily understood by a person skilled in the relevant art.

On the other hand, the side rail 20b is "loosely" or slidably held by the connector panel 30, where bolts 33, which are advantageously shorter than the bolts 32, softly or at least not tightly press the aslant surface 22b of the side rail 20b through the other two bolt holes 34 for just providing a stable enough holding of the side rail 20b with the connector panel 30 without rattling. Such soft but stable pressing by the "shorter bolts" will provide slidable engagement between the outer engagement protrusions 21 of the side rail 20b and the inner engagement protrusions 31 of the connector panel 30. Such a soft holding may be provided as well when bolts merely "contact" the aslant surface 22b. Alternatively, use of the shorter bolts 33 may be totally eliminated, which will still provide a certain degree of hold between the connector panel 30 and the side rail 20b.

The connection structure 100 of the present invention also utilizes a connector belt or wire, of which a connector belt 40 is shown in this embodiment. This connector belt 40 is flexible but strong enough to adequately resist shrinking force exerted from the shrinking side rails 20a and 20b and at least adequately prevent the slidably held cable/pipe bed section 10b from accidental dismantling. Such a connector belt 40 may be advantageously made of an electrically conductive material such as stainless steel or aluminum to allow conductivity between cable/pipe bed sections.

The connector belt 40 in this embodiment is provided with a plurality of bolt holes 43 to be selectively utilized for adequately positioning and flexing the connector belt 40. At least two bolts 42 are used through as many bolt holes 43 for securing the connector belt 40 on the rung 51 of the cable/pipe bed section 10a and the rung 52 of the cable/pipe bed section 10b. It should be appreciated that for simplification of illustration of the embodiment, the connector belt 40 is shown without any flexion and the side rail 20a and the side rail 20b are connected in longitudinal alignment without any gap therebetween.

Such a connector belt or wire 40 may be provided between the side rails 20a and 20b instead of the rungs 51 and 52. When two cable/pipe bed sections (20a, 20b) are provided with cable/pipe floor means other than rungs (51, 52) (not shown), such a connector belt or wire 40 may appropriately connect the floor means of the two cable/pipe bed sections.

Figure 4:
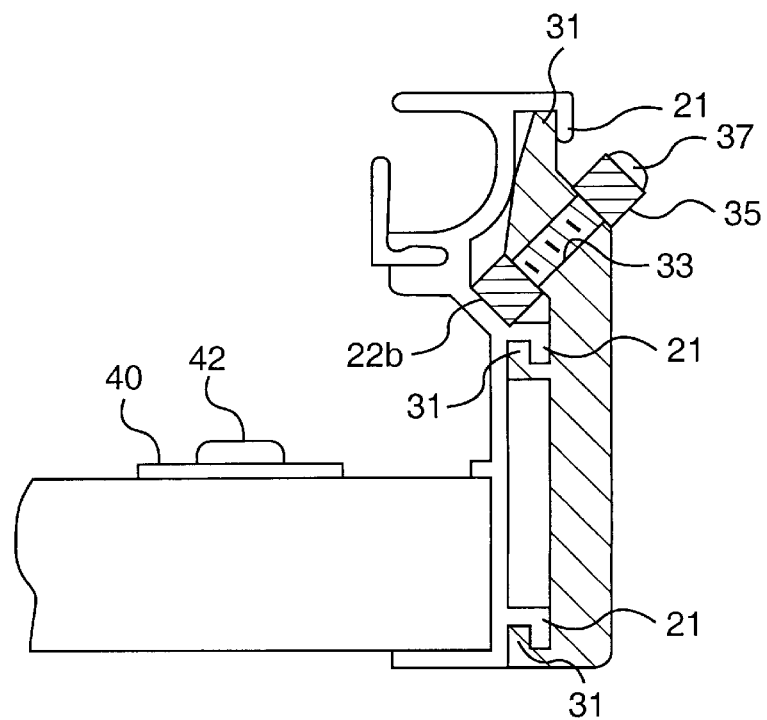
FIG. 4 is a partially sectioned front view of the embodiment of FIG. 3, showing in detail the connection between a connector panel and a "loosely" held side wall of a cable bed section.
Figure 3:
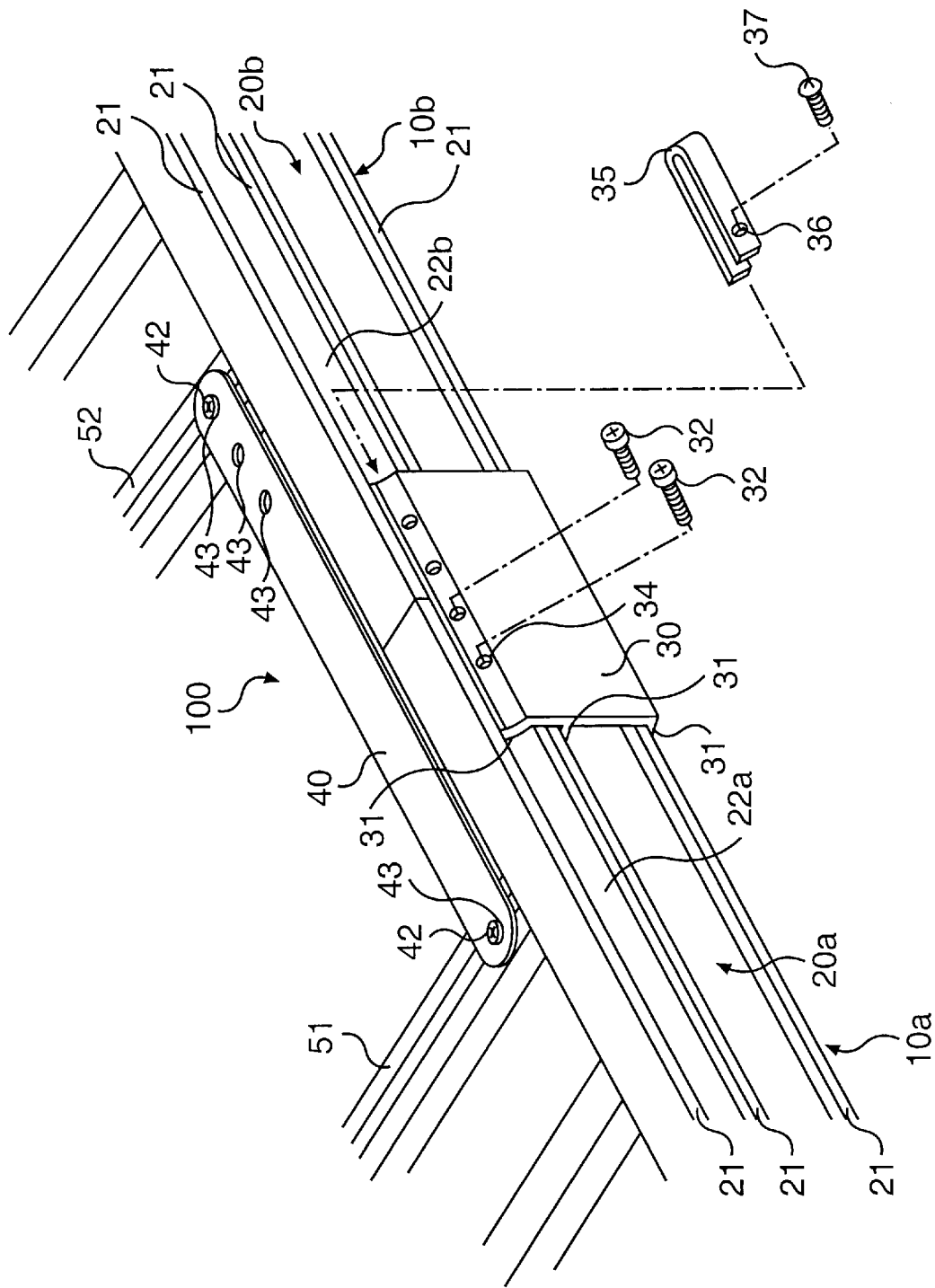
FIG. 3 is a perspective view of a connection structure according to another embodiment of the present invention.

In FIG. 3, there is shown a modification of the foregoing embodiment, in which a U-shaped washer device 35 having a bolt hole 36 is utilized. The washer device 35 may have a plurality of such holes 36 if so preferred. The U-shaped washer device 35 is mounted on the connector panel 30 as shown by an arrow in FIG. 3 and in FIG. 4 for detail, which is "softly" fastened onto the connector panel 30 and the side rail 20b with a bolt 37 so as to facilitate adequate slippage of the side rail 20b. The use of such a U-shaped washer 35 may be advantageous over the previous embodiment in that the side rail 20b can be more stably held without rattling by the connector panel 30 and the slippage of the side rail 20b on the connector panel 30 can be more smoothly provided. FIG. 4 shows the slidable and stable holding of the side rail 20b with the connector panel 30 in detail.

Figure 5:
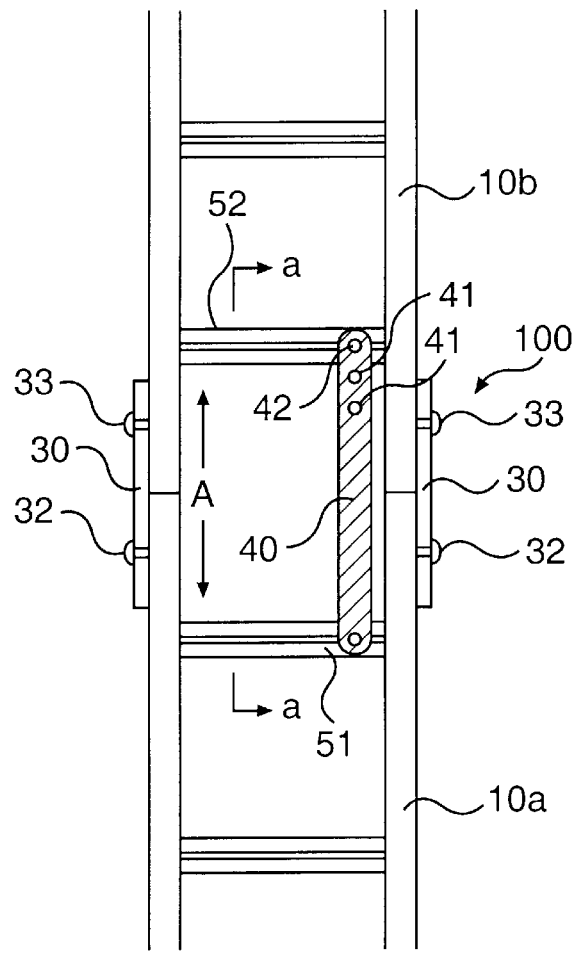
FIG. 5 is a plan view of a connection structure according to an embodiment of the present invention, which is generally utilized in the summer time.
Figure 6:
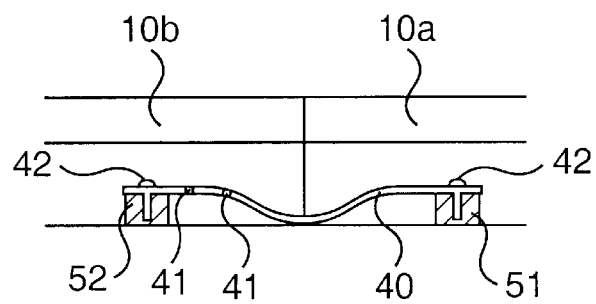
FIG. 6 is a sectional view taken along line a—a in FIG. 5.

FIGS. 5 and 6 show an embodiment of utilization of the connection structure of the present invention. As shown in the figures, the side rails 20a and the side rails 20b are respectively aligned longitudinally without a substantial gap and the connector belt 40 is provided having a flexion. This embodiment is for installing a cable/pipe bed utilizing the present invention in the summer time or a hot season to adequately cope with longitudinal shrinkage of the side rails 20a and 20b during a colder season, when the side rails 20a and 20b will be separated from each other. The connector belt 40 will be stretched or have less flection, then.

In an experiment, it was observed that a side rail longitudinally expands or shrinks about 14 mm per 9 m of the rail between summer and winter. Such an expansion or shrinkage can be easily dealt with by appropriate use of the connector belts 40 of the invention.

Figure 7:
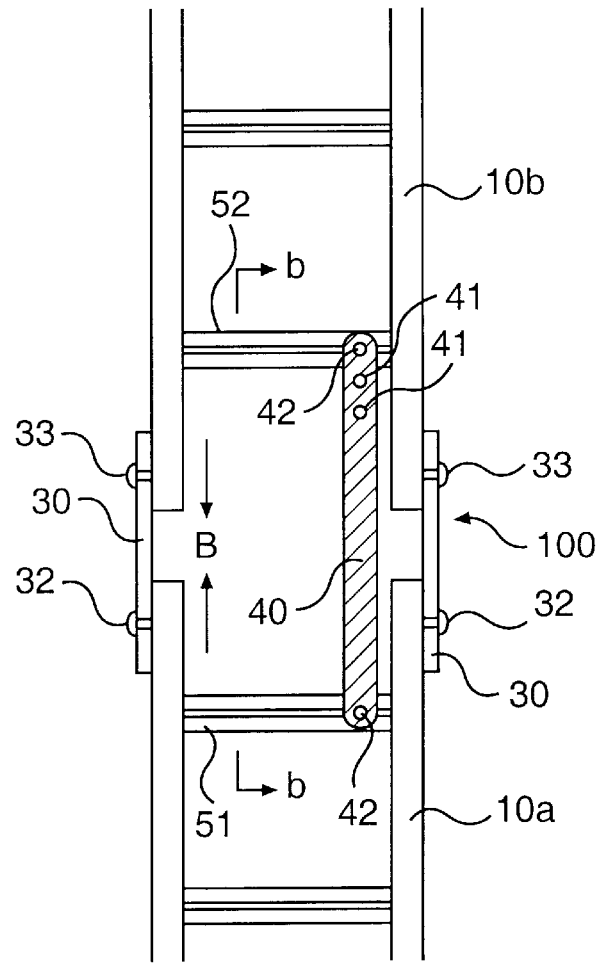
FIG. 7 is a plan view of a connection structure according to another embodiment of the present invention, which is generally utilized in the winter time.
Figure 8:
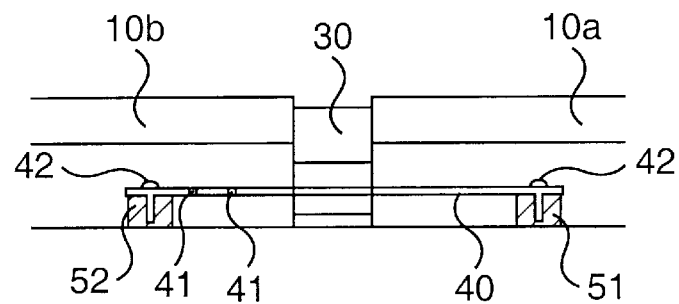
FIG. 8 is a sectional view taken along line b—b of FIG. 7.

FIGS. 7 and 8 show a utilization of the present invention in the winter time or a cold season. The side rails 20a and the side rails 20b are respectively connected in longitudinal alignment with connector panels 30 having a "wide" gap. The connector belt 40 is mounted on the cable/pipe bed sections 10a and 10b substantially without flexion. This arrangement facilitates a measure against longitudinal expansion of side rails 20a and 20b in a hotter season, when the gap between the side rails 20a and 20b may be totally eliminated. The connector belt 40 will then have a flexion.

Figure 9:
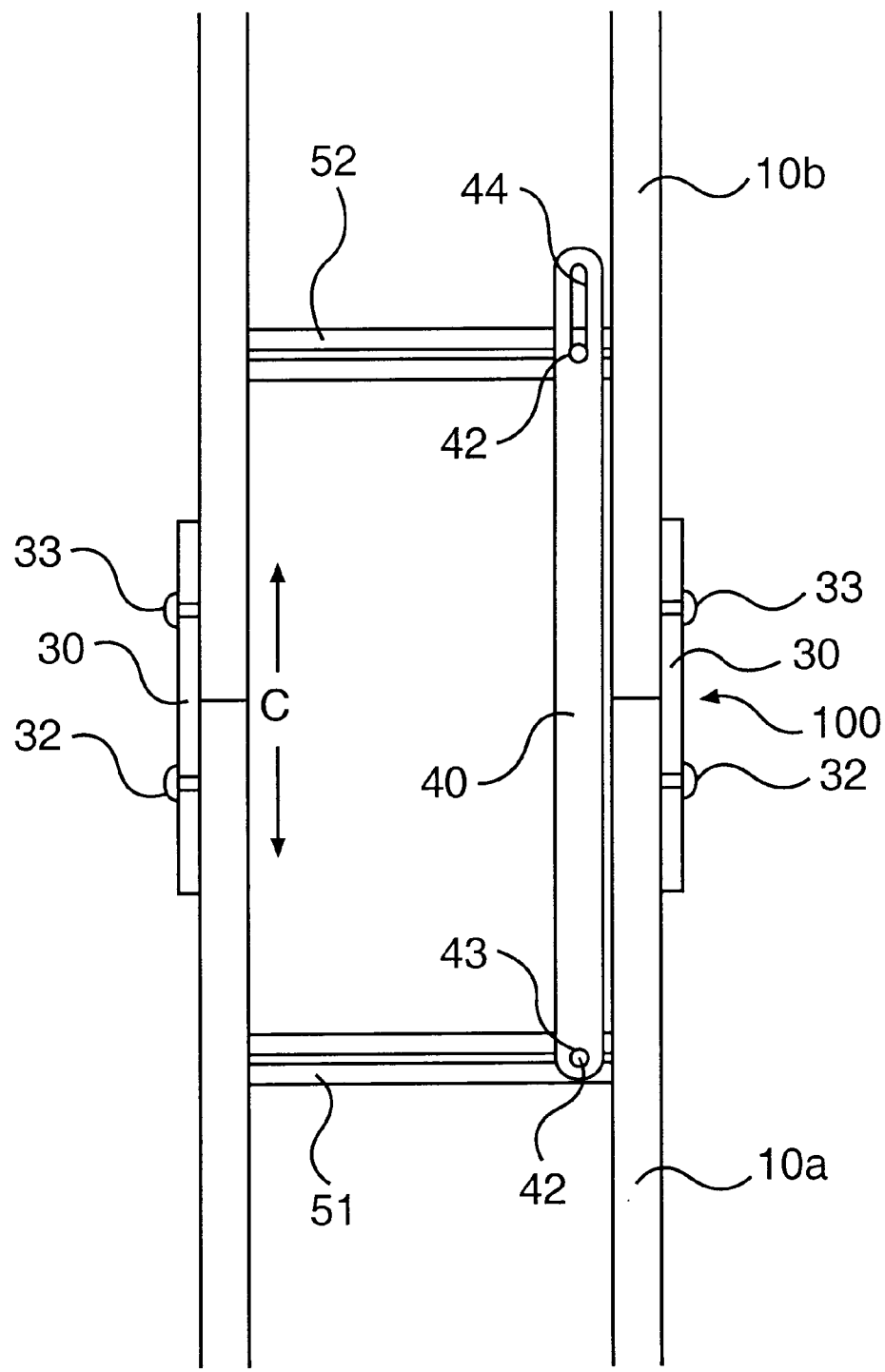
FIG. 9 is a plan view of a connection structure according to still another embodiment of the present invention.
Figure 10:
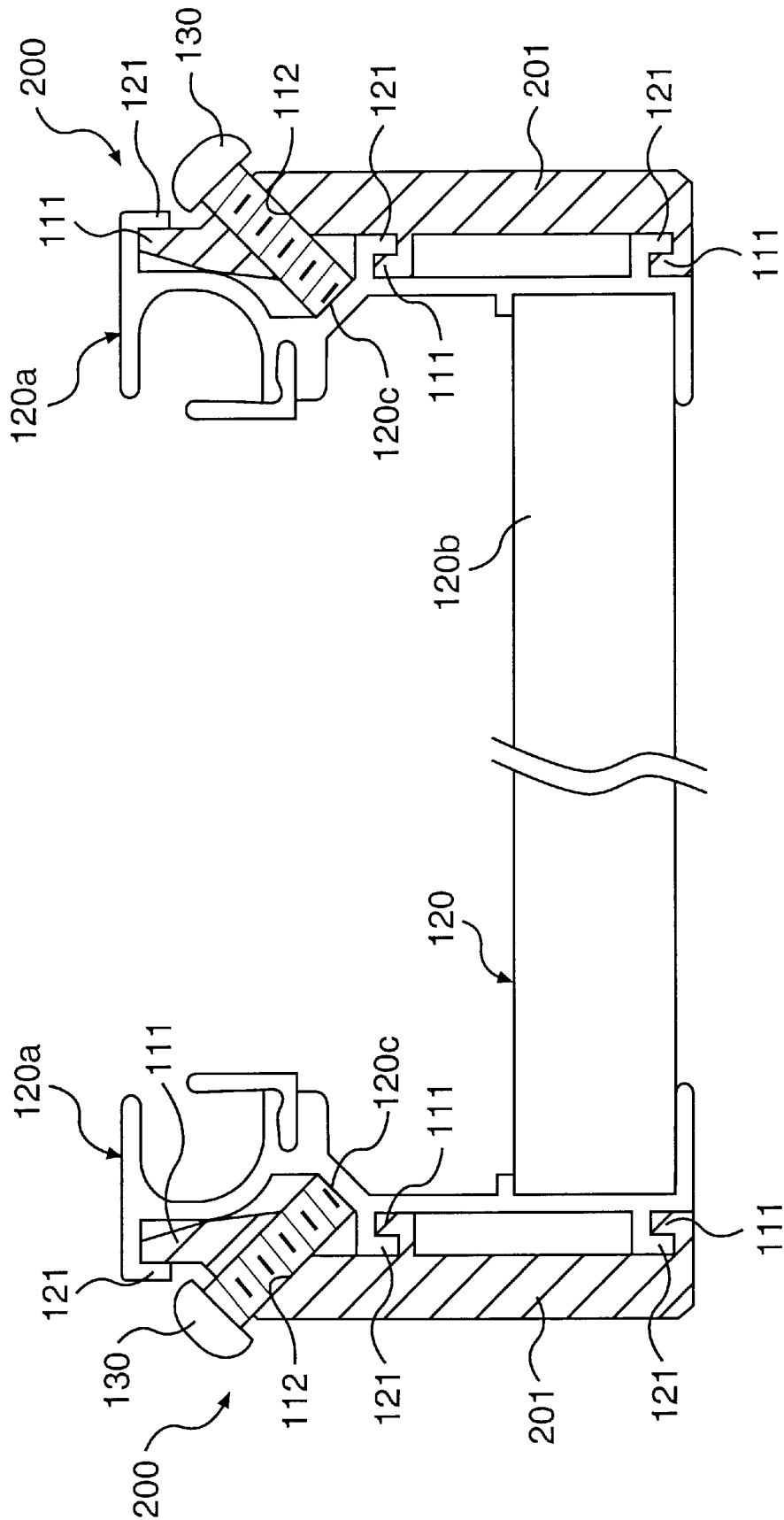
FIG. 10 is a partially sectioned front view of a conventional connection structure for a cable/pipe bed.

In FIG. 9 is shown a modification of the connection belt 40. This connection belt 40 has a bolt hole 43 and an elongated opening 44 for slidably receiving a bolt 42. This connection belt 40 may be flexible or may not be flexible. The elongated opening 44 and the bolt 42 received in the opening 44 will adequately cope with expansion and shrinkage of the side rails 20a and 20b. FIG. 9 shows a state of the connection of the cable/pipe bed sections 10a and 10b in the summer time.

All the above embodiments are provided for illustration of the present invention only and not for restriction of the invention. The true scope of the invention is given by the following claims.

What is claimed is:

1. A cable/pipe bed connection structure capable of adequately coping with thermal expansion and shrinkage of a cable/pipe bed which comprises a plurality of cable/pipe bed sections each comprising two side rails provided in parallel and a cable/pipe floor provided between the side rails, each side rail comprising at least one outer engagement protrusion and a longitudinal bolt receiver surface, the connection structure comprising:

a plurality of connector panels each having at least one inner engagement protrusion which engages said at least one outer engagement protrusion, and at least one bolt hole formed in said connector panels, said at least one inner engagement protrusion engaging said outer engagement protrusions of the two side rails;

at least one bolt securely screwed through said at least one bolt hole of each said connector panel onto said surface of either one of each two longitudinally aligned side rails such that said one side rail is securely held by said connector panel, leaving the other side rail slidable on the connector panel; and at least one connector belt or wire for each two said longitudinally aligned cable/pipe bed sections, whose end portions are respectively attached to said two cable/pipe bed sections so as to prevent dismantling of the cable/pipe bed sections.

2. A connection structure according to claim 1, wherein said connector panel has two or more bolt holes and said the other side rail is slidably held with at least one bolt screwed through said bolt holes to be slidably held by said connector panel.

3. A connection structure according to claim 1 or 2, wherein said cable/pipe floor is a plurality of rungs and said connector belt or wire is attached to said rungs.

4. A connection structure according to claim 1 or 2, wherein said connector belt or wire is flexible and bendable.

5. A connection structure according to claim 1 or 2, wherein said connector belt or wire is conductive.

6. A connection structure according to claim 3, wherein said connector belt or wire is flexible and bendable.

7. A connection structure according to claim 3, wherein said connector belt or wire is conductive.

8. A connection structure according to claim 4, wherein said connector belt or wire is conductive.

9. A connection structure according to claim 6, wherein said connector belt or wire is conductive.

* * * * *